United States Patent [19]

Van Marcke

[11] Patent Number: 5,215,216
[45] Date of Patent: Jun. 1, 1993

[54] WATER FLOW RESPONSIVE SOAP DISPENSER

[75] Inventor: Karel C. Van Marcke, Kruishoutem, Belgium

[73] Assignee: International Sanitary Ware Manufacturing, Kruishoutem, Belgium

[21] Appl. No.: 765,436

[22] Filed: Sep. 25, 1991

[51] Int. Cl.⁵ .............................................. G01F 11/00
[52] U.S. Cl. ........................................ 222/1; 4/605; 4/678; 222/52; 222/207; 222/214; 222/335; 222/406
[58] Field of Search ...................... 222/1, 52, 207, 214, 222/335, 406; 4/559, 605, 661, 675, 678

[56] References Cited

U.S. PATENT DOCUMENTS

| | | | |
|---|---|---|---|
| 3,455,487 | 7/1969 | Crippen et al. | 222/207 |
| 4,261,356 | 4/1981 | Turner et al. | 222/207 X |
| 4,863,066 | 9/1989 | Uffenheimer et al. | 222/1 |
| 4,941,219 | 7/1990 | Van Marcke | 4/623 |
| 4,956,883 | 9/1990 | Lane | 4/605 |
| 4,998,850 | 3/1991 | Crowell | 222/52 X |

FOREIGN PATENT DOCUMENTS 1224592  4/1986  U.S.S.R. .............................. 222/52

Primary Examiner—Andres Kashnikow
Assistant Examiner—Joseph A. Kaufman
Attorney, Agent, or Firm—Cahill, Sutton & Thomas

[57] ABSTRACT

A volumetrically variable soap chamber partially collapses in response to an initial increased pressure state imposed by initiation of water flow and a predetermined quantity of liquid soap will be dispensed. The soap chamber is replenished from a source of liquid soap in response to a reduced pressure state in the soap chamber imposed by the cessation of water flow.

21 Claims, 3 Drawing Sheets

WATER FLOW RESPONSIVE SOAP DISPENSER

BACKGROUND OF THE INVENTION

1. Field of the Invention

The present invention relates to dispensers for liquid soap and, more particularly, to automated dispensers for dispensing liquid soap in response to initiation of a flow of water.

2. Description of Prior Art

Public and commercial wash stations usually include apparatus for dispensing powder or liquid soap. The soap powder dispensers often have a vertically translatable manually actuated closure member for exposing an aperture at the bottom of a soap powder container. The powder soap drops through the aperture and usually into the user's hand(s) placed therebeneath. A dispenser of this type, while usually very effective, suffers from several drawbacks. First, a substantial amount of soap powder falls onto the underlying surface, whether it be a section of a wash basin, the floor or other element. This dropped soap creates a mess if it becomes moistened or wetted. Whether in powdered, wetted or liquid form, efforts must be made for periodic cleaning. Second, manual contact with the closure member is necessary. Such manual contact permits the spread of bacterial and viral contamination. Other soap powder dispensers are known which include a push button, a horizontally actuated member or a pivoting member for dispensing a quantity of powder soap; again, manual contact is necessary.

Liquid soap dispensers have been in use for many years. Dispensation of the soap will occur upon reciprocal translation of a plunger, a push button release mechanism or simply tilting the dispenser to force outflow of soap through an aperture. All of these liquid soap dispensers require manual actuation of one element or another. Such actuation serves as a vehicle for transmission of bacterial and viral contaminants to subsequent users.

There also exist pneumatically actuated mechanisms for dispensing soap in response to a triggering signal. These devices require a relatively substantial amount of power, usually in the form of electrical power, to maintain the air or gas pressure necessary to operate the pneumatic dispenser. For practical reasons, batteries are not a viable source for the electrical power. Electrically operated motor/pump units are known for dispensing liquid soap. Because of the magnitude of the current drawn to operate the electric motor, battery operation is generally not considered a practical and viable solution.

Because conventional electrical power (120 volts AC) will create an electrical hazard in proximity to a wash basin, or the like, use of conventional electrical power to provide power for a soap dispenser is generally not considered a viable alternative. Hence, most soap dispensers found, whether for soap powder or liquid soap, are of the manually actuated type discussed above.

SUMMARY OF THE INVENTION

One chamber of a dual chamber container interconnects a source of water under pressure with a water outlet. The other chamber interconnects a source of liquid soap with a soap dispensing nozzle. A flexible pressure responsive membrane segregates the two chambers. Upon opening a water valve intermediate the source of water and the water chamber, a resulting pressure rise in the water chamber will cause displacement of the membrane into the soap chamber. The resulting volumetric reduction of the soap chamber urges dispensation of soap through the dispensing nozzle. Upon closing of the water valve, the membrane will resume is quiescent state and the volumetric increase with commensurate pressure reduction in the soap chamber will draw soap from the source to refill the soap chamber. Check valves preclude upstream flow of both the water and the liquid soap.

It is therefore a primary object of the present invention to provide a water pressure actuated soap dispenser.

Another object of the present invention is to provide a soap dispenser actuated upon initiation of water flow at a wash basin.

Yet another object of the present invention is to provide a soap dispenser which is pressure responsive to the presence and absence of water flow to control the outflow and refill of liquid soap.

Yet another object of the present invention is to provide a dual chamber container having a segregating flexible membrane for discharging a fluid from one chamber in response to a pressure rise in the other chamber.

A further object of the present invention is to provide a soap dispenser locateable at a wash basin, which soap dispenser dispenses soap in response to proximity of a user.

A still further object of the present invention is to provide a soap dispenser having an outlet remote from the source for generating an actuating signal to actuate the soap dispenser.

A yet further object of the present invention is to provide a method for dispensing a first fluid in response to a pressure change of a second fluid.

A yet further object of the present invention is to provide a pressure responsive soap dispenser actuated in response to the proximity of a user.

These and other objects of the present invention will become apparent to those skilled in the art as the description there proceeds.

DESCRIPTION OF THE PREFERRED EMBODIMENT

It has become common practice to install automatic no-touch faucets in high traffic public wash rooms and in work places for the purpose of alleviating a user's fears of spread of bacterial and viral infections/diseases. Since washing with only water is not particularly effective in most cases, users generally expect and demand soap. Bar soap, individually packaged, provides a user with soap and generally tends to avoid or at least ameliorate the spread of infection/disease through contact by a previous person but the unused part of the soap, as well as the packaging, creates a source of refuse that will quickly accumulate. Moreover, substantial theft of the wrapped bar soap will occur and the cost of supplying the soap will increase dramatically. Presently available liquid soap dispensers generally function on the principal of a soap pump/peristaltic system. Such systems require substantial energy. If the energy is provided by the user, the resulting manual contact negates the sanitary benefits attendant the water dispensation system. To use conventional electrical power (such as 120 volt AC) to energize an electric motor to operate the pump for the soap dispenser creates a safety hazard. To use low voltage batteries as the energy source is not realistic because of the high power demands imposed by the pump.

Figure 1:
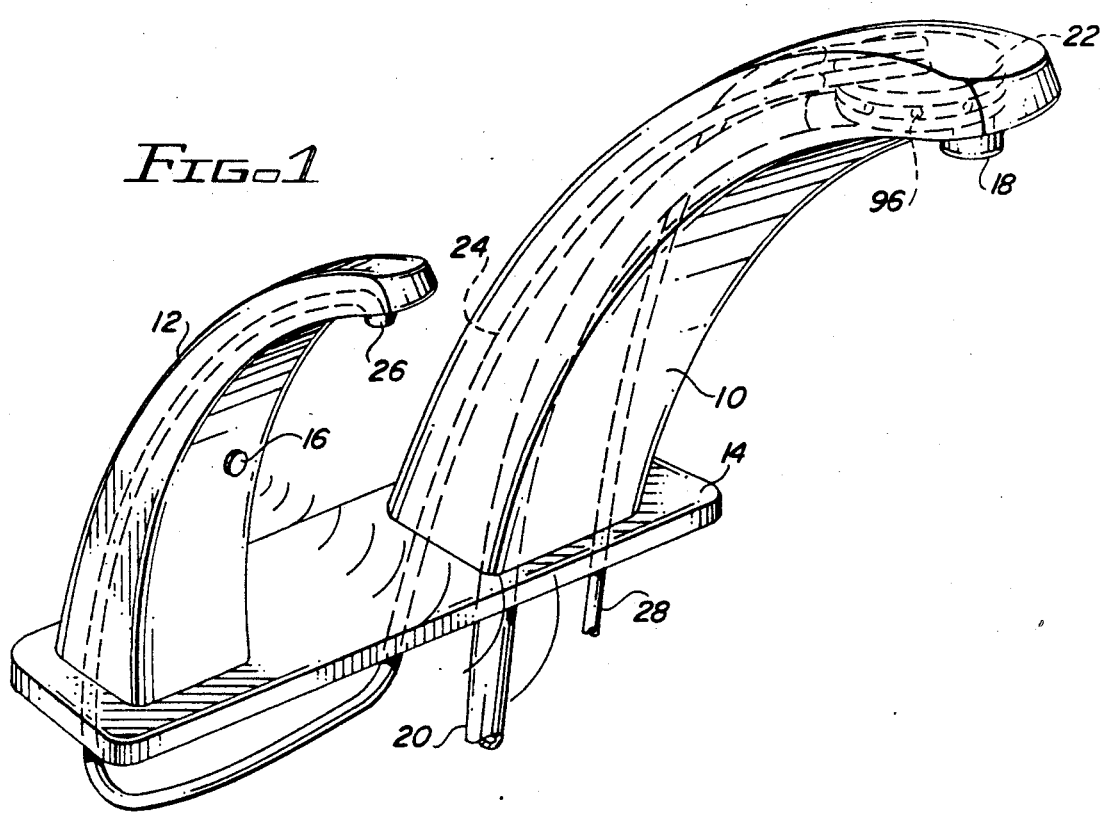
FIG. 1 illustrates a typical installation of an automated soap dispenser in proximity to a wash basin.

Referring to FIG. 1, there is illustrated in representative form a water faucet 10 for dispensing water and a soap faucet 12 for dispensing liquid soap, both of which faucets extend from a pedestal 14. The pedestal may be secured to the edge of a wash basin or the like. A proximity detector 16 may be mounted upon the soap faucet, as shown, or upon the water faucet. It senses the presence of a user and generates a signal to actuate water flow through water outlet 18, as taught in U.S. Pat. No. 4,941,219. The water flows through a conduit 20 from a source of water under pressure to a container 22 disposed within water faucet 10 in the embodiment illustrated. The water flows out of the container through a conduit or directly through water outlet 18. The rapid pressure rise within container 22 actuates an internally mounted diaphragm to pump a quantity of soap through conduit 24 interconnecting the container with soap dispensing nozzle 26 in the soap faucet. Accordingly, liquid soap will be dispensed from soap faucet 16 upon initiation of water through water outlet 18 without any manual contact by a user. On cessation of water flow, prompted by operation of detector 16 as a result of the user moving out of range, the water flow through conduit 20 will cease. The resulting repositioning of the diaphragm within container 22 will draw a quantity of soap from a source of soap (not shown) through conduit 28 into the container. Thereby, container 22 becomes armed (or filled) for dispensing soap during the next cycle of operation.

Figure 2:
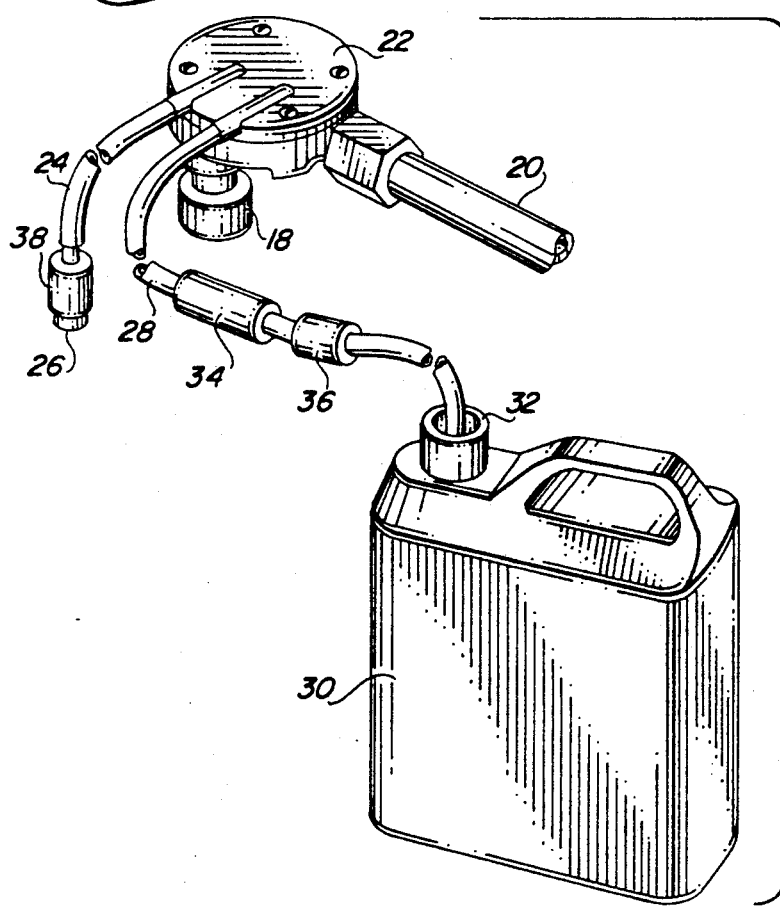
FIG. 2 illustrates apparatus useful for effecting operation of the automated soap dispenser.

Referring to FIG. 2, further details attendant the apparatus illustrated in FIG. 1 are shown. The liquid soap may be contained within a replaceable tank 30. Conduit 28 may be simply inserted into the tank or attached thereto through a fitting engaging neck 32 of the tank. To fill initially conduit 28 and container 22 with soap, a squeezable hand pump 34 may be located in line with conduit 28. Hand pumps of this type are well known and readily available. By repetitively squeezing the hand pump, the soap will be drawn into and through conduit 28 and fill a soap chamber within chamber 22.

To prevent reverse flow of the soap within the conduit and to maintain the conduit full, a check valve 36 is placed in line with the conduit. A check valve 3 is disclosed in conduit 24 upstream of nozzle 26 to prevent air flow through the nozzle into container 22.

Referring jointly to FIGS. 3, 4, 5 and 6, there are shown schematic diagrams of the structure and function of the various elements necessary to effect soap dispensation upon initial water flow through the water outlet. To assist in understanding the schematic illustrations, the references numerals depicted in FIGS. 1 and 2 will be incorporated for common elements. Water conduit 20 is connected to a source 40 of water under pressure through a valve 42. The valve is automatically operated in response to a signal generated by detector 16 (see FIG. 1). Downstream of the valve there is disposed a check valve 44 to preclude upstream flow of water to the source of water when valve 42 is open (such upstream directional flow restrictions are generally required by most municipal water codes and the like).

Container 22 defines a water chamber 50 and a soap chamber 52 segregated by a diaphragm 54. The diaphragm maintains the integrity of the different chambers to prevent cross flow there between. The diaphragm is pressure responsive and will tend to equalize the pressure in each chamber by flexing and stretching into the chamber having the lesser pressure. Accordingly, the volumes of the two chambers will vary as a function of the difference in pressures therebetween. Conduit 20 is connected to chamber 50 and defines an outlet 56. The water flows to nozzle 18 through an inlet 58 in fluid communication with chamber 50 and formed as part of a conduit 60 interconnecting the inlet with nozzle 18. To ensure a relatively rapid pressure rise within chamber 50 upon initial flow of water through conduit 20, outlet 56 may be sized substantially greater than inlet 58. Chamber 52 is interconnected with conduit 28 through outlet 62 in fluid communication with the chamber. Conduit 24 is in fluid communication with the chamber through inlet 64.

Figure 4:
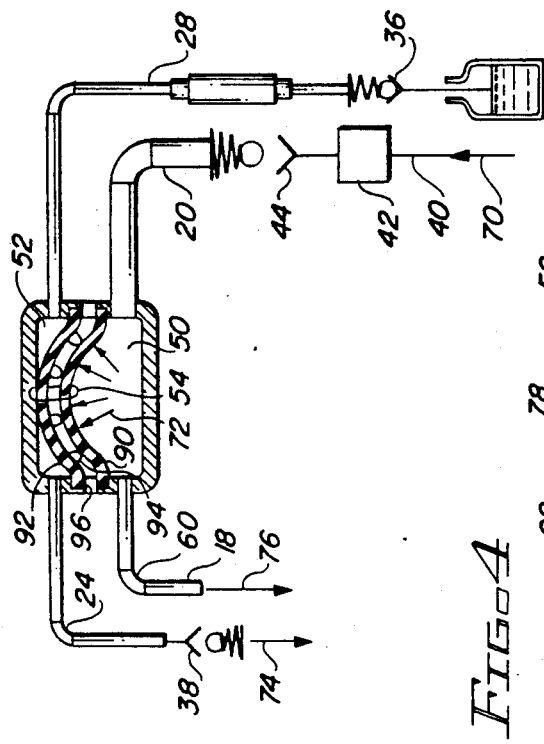
FIG. 4 representatively illustrates operation of the apparatus upon initiation of water flow.
Figure 3:
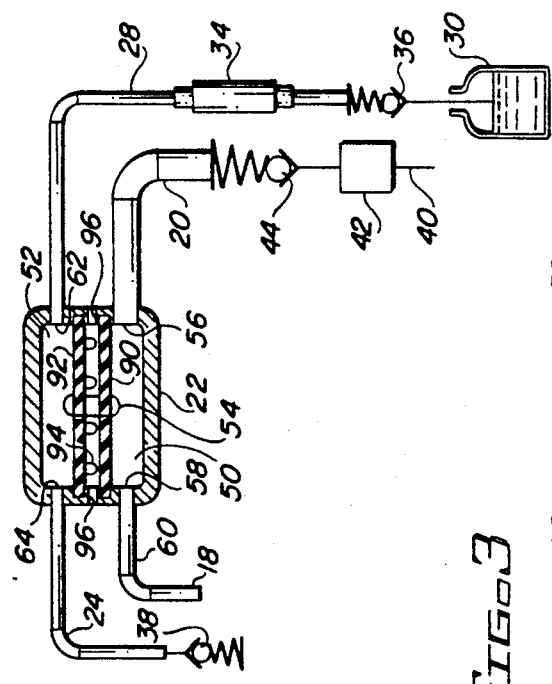
FIG. 3 representatively illustrates the state of the apparatus prior to initiation of water flow.

The quiescent state prior t operation is illustrated in FIG. 3. Upon detection of a user by detector 16 (see FIG. 1), a signal is generated to open valve 42 in conduit 20. The opening of the valve will result in a flow of water through the valve, as depicted by arrow 70, as shown in FIG. 4. The pressure of the flowing water will open check valve 44. The water inflow into chamber 50 will cause a pressure rise therein. This pressure rise is presented by arrows 72 directed toward diaphragm 54. As a result, the diaphragm will flex upwardly as indicated, into chamber 52. As discussed with respect to FIG. 2, soap chamber 52 is initially filled with liquid soap. The incursion of diaphragm 54 into the soap chamber will result in a pressure rise therein. Check valve 36 in conduit 28 prevents flow of the liquid soap through the conduit into tank 30. The only remaining direction of flow is through conduit 24, check valve 38 and out through the nozzle, as depicted by arrow 74. Thus, upon initial flow of water into chamber 50, a quantity of liquid soap is dispensed through the nozzle from chamber 52. Shortly after the initial pressure surge within chamber 50, the pressure therein will stabilize as a result of water outflow, as depicted by arrow 76, through outlet 18 at the end of conduit 60.

Figure 5:
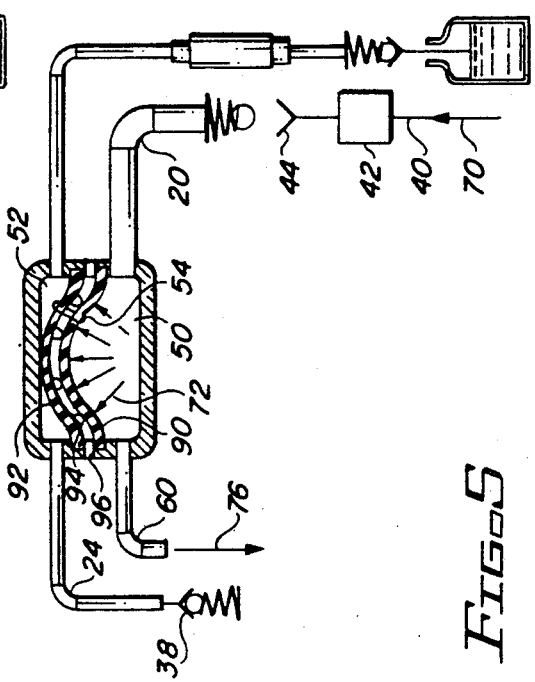
FIG. 5 representatively illustrates operation of the apparatus during ongoing water flow.

FIG. 5 illustrates the state of the various elements during steady state water flow, as represented by arrow 76. When the pressure rise within chamber 52 has been dissipated through discharge of soap via conduit 24 and nozzle 26, the pressure on opposed sides of check valve 38 will be equalized and the check valve will be closed, as shown. Since water flow is ongoing through conduit 20, check valve 44 will remain open. Moreover, the pressure within chamber 50 will remain relatively constant, as depicted by arrow 72 and diaphragm 54 will remain distended.

Figure 6:
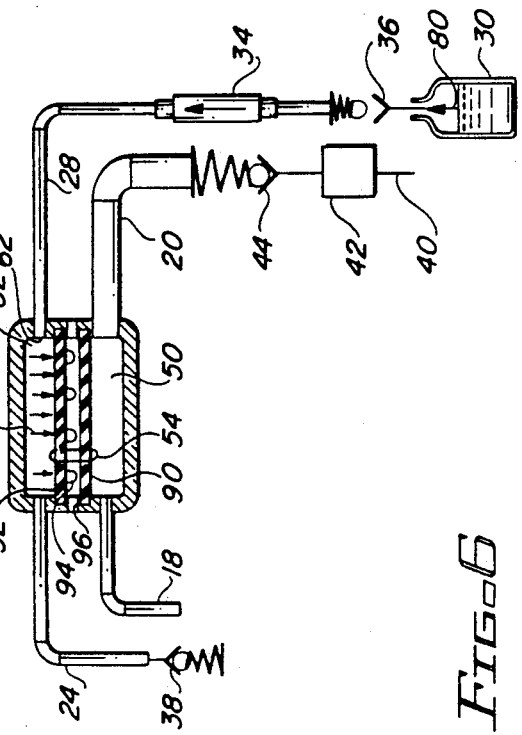
FIG. 6 representatively illustrates the apparatus upon cessation of water flow.

When water valve 42 is turned off, as a result of the signal(s) generated through operation of detector 16 (see FIG. 1), further water flow through conduit 20 will cease. The resulting equalization of pressure on opposed sides of check valve 44 will cause the check valve to close. The pressure within chamber 50 will drop to ambient pressure. The reduction of pressure in chamber 52 will result in diaphragm 54 assuming its quiescent state, as depicted in FIG. 6. The resulting volumetric increase in chamber 52 will create a low pressure environment, as represented by arrows 78. The resulting low pressure will be translated to conduit 24 but as check valve 38 is closed, ait flow therethrough cannot occur. A similar low pressure environment will occur in conduit 28. Since ambient pressure is present with tank 30, the ambient pressure will act upon the inlet to conduit 28, which inlet is immersed within the supply of soap. The ambient pressure will force the flow of soap through the inlet and into conduit 28, as depicted by arrow 80. This flow will continue through·check valve 36, displaced into the open position due to the difference of pressure there across, through hand pump 34 and through outlet 62 into chamber 52. It will therefore become evident that through operation of the elements, as depicted in FIG. 6, chamber 52 is replenished with liquid soap upon cessation of water flow through water outlet 18.

Membrane 54, as depicted in FIGS. 3 to 6, may be a dual element 90,92 membrane for reasons of safety to prevent intermixing of the soap and water. A plurality of spacers 94 may be disposed between the membranes to maintain separation. Container 22 may include a plurality of apertures 96 in general alignment with the space between membranes 90,92 (see also FIG. 1). In the event one of membranes 90 or 92 is slit, punctured, or otherwise damaged, flow therethrough will enter the space between the two membranes and exhaust through one or more of apertures 96. Thus, intermixing between the soap and water will be prevented.

Figure 7:
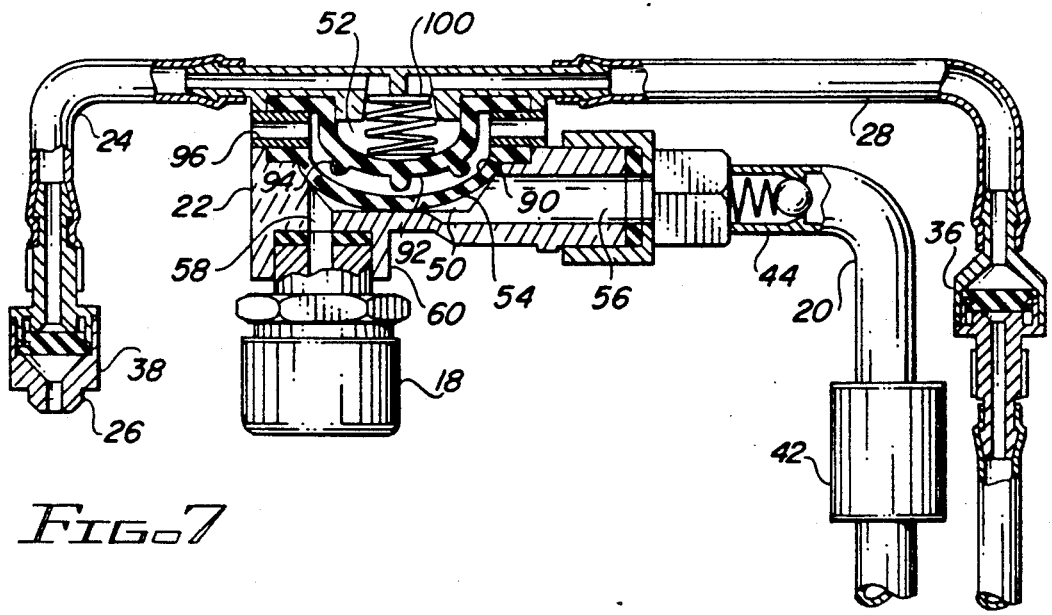
FIG. 7 illustrates apparatus for preventing water and soap mixing in the event of membrane leakage.
Figure 8:
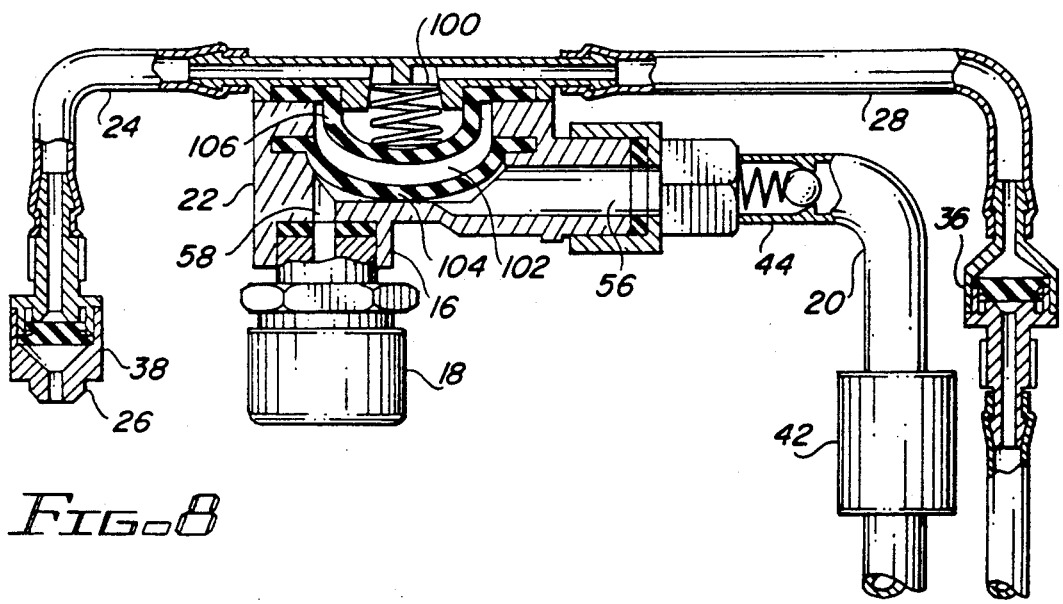
FIG. 8 illustrates a variant structure for preventing intermixing of the soap and water.
Figure 9:
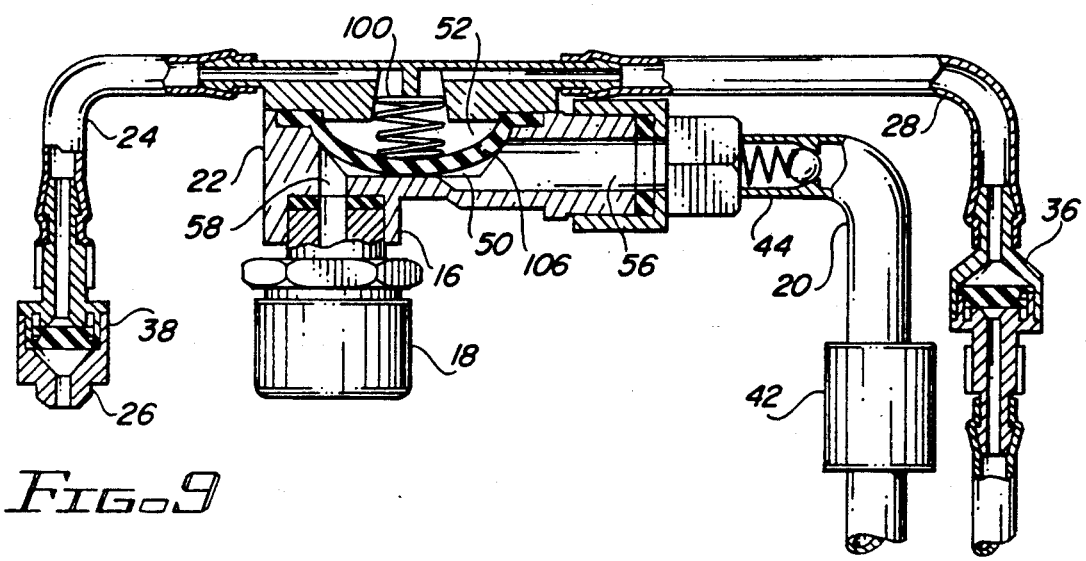
FIG. 9 illustrates a further variant for accommodating leakage of the chamber segregating the diaphragm.

Referring jointly to FIGS. 7, 8 and 9, variants of container 22 will be described. Furthermore, additional details attendant the structure is shown. For sake of commonality of reference and ease of understanding, reference numerals identifying common elements shown in others of the figures will be employed.

Chamber 52 depicted is relatively small in size, and may be practically nonexistent with diaphragm 54 is in the quiescent state (shown in FIG. 3). Additionally, a spring 100 may be disposed within chamber 52 to encourage deflection of the diaphragm into chamber 50. This spring has the further advantage of augmenting deflection of the diaphragm upon cessation of water flow to ensure sufficient volumetric increase in chamber 52 to draw liquid soap into the chamber through conduit 28. FIG. 7 particularly illustrates the membrane as including two membranes 90,92 with spaces 94 therebetween and outlets 96, as described above.

The variant shown in FIG. 8 does not include spacers 94 nor apertures 96. Instead, cavity 102 disposed between membranes 104,106 may be filled with an inert gas, such as nitrogen or the like. Thereby, loss of integrity of one of the membranes will not result in intermixing of the soap and water.

FIG. 9 illustrates a container 22 having a single membrane 106 disposed therein to define chambers 50 and 52. Spring 100 may be employed to encourage reestablishment of chamber 52 upon cessation of water flow. In the event the membrane is damaged, intermixing of the water and the soap will probably occur. In such event, the water, being at substantially higher pressure than the soap, will be discharged through both water outlet 18 and nozzle 26. Water flow through conduit 28 into tank 30 will not occur due to the blocking function provided by check valve 36. Flow of soap into conduit 20 will not occur due to both check valve 44 and the fact that the water within conduit 20 will be at a much higher pressure when valve 42 is open; without valve 42 being open, no flow of any sort will occur to source 40.

While the principles of the invention have now been made clear in an illustrative embodiment, there will be immediately obvious to those skilled in the art many modifications of structure, arrangement, proportions, elements, materials and components used in the practice of the invention which are particularly adapted for specific environments and operating requirements without departing from those principles.

I claim:

1. An automated dispenser for dispensing liquid soap from a source of liquid soap proximate a wash basin having a source of water, said dispenser comprising in combination:
   a) a first chamber for receiving a quantity of liquid soap from the source of liquid soap and housing the quantity of liquid soap prior to dispensation of the liquid soap;
   b) a second chamber for housing water and for accommodating flow of water therethrough from the source of water;
   c) means disposed intermediate said first and second chambers for pressurizing said first chamber in response to flow of water from the source of water through said second chamber;
   d) a nozzle for dispensing liquid soap housed in and flowing through said first chamber in response to said pressurizing means, and a second nozzle separate from the first nozzle for dispensing water;
   e) said pressurizing means including means for reducing the pressure within said first chamber upon cessation of flow of water through said second chamber and for drawing liquid soap from the source of liquid soap into said first chamber to house liquid soap therein in response to the reduced pressure
   f) said first chamber having an inlet end an outlet different from said inlet, and
   g) means for detecting the proximity of the user to the wash basin.

2. The dispenser as set forth in claim 1 wherein said pressurizing means comprises a membrane interconnecting said first chamber and said second chamber.

3. The dispenser as set forth in claim 2 wherein said membrane comprises a pair of membranes adjacent to but separated from one another.

4. The dispenser as set forth in claim 3 including spacers disposed intermediate said pair of membranes for maintaining said membranes separated from one another.

5. The dispenser as set forth in claim 3 including a container housing said first and second chambers and a space defined by said pair of membranes and said container.

6. The dispenser as set forth in claim 5 including apertures disposed in said container for venting said space defined by said pair of membranes.

7. The dispenser as set forth in claim 1 including means for filling said first chamber with liquid soap on cessation of flow of water from the source of water.

8. The dispenser as set forth in claim 1 including a container for housing said first chamber, said second chamber and said pressurizing means.

9. A method for dispensing liquid soap and water at a wash basin in response to the proximity of a user to the wash basin, said method comprising the steps of:
   a) providing for a flow of the water in response to detection of a user;
   b) applying pressure to a chamber containing the liquid soap in response to the flow of water resulting from exercise of said step of providing;
   c) discharging a quantity of the liquid soap from the chamber in response to said step of applying pressure;
   d) reducing pressure within the chamber upon cessation of the flow of water;
   e) replenishing the liquid soap in the chamber in response to said step of reducing; and
   f) dispensing the water and soap through separate nozzles.

10. The method as set forth in claim 9 wherein said step of providing includes the step of filling a further chamber with water under pressure and wherein said step of applying pressure includes the step of reducing the size of the chamber containing the liquid soap in response to the increase in pressure in the further chamber.

11. The method as set forth in claim 10 wherein said step of reducing pressure includes the step of increasing the size of the chamber.

12. The method as set forth in claim 11 wherein said step of increasing includes the step of diminishing the volume of the further chamber.

13. The method as set forth in claim 12 wherein said steps of applying pressure and diminishing the volume comprise the step of flexing in a first direction and in a second direction, respectively, a membrane interconnecting the chamber and the further chamber.

14. The method as set forth in claim 9 including the step of preventing intermixing of the soap and water fluids.

15. The method as set forth in claim 9 wherein said step of replenishing includes the step of increasing the volume of the chamber in response to cessation of flow of the water.

16. The method as set forth in claim 9 including the step of initially filling the chamber with the soap.

17. Apparatus for automatically dispensing liquid soap in response to the proximity of a user to a wash basin, said apparatus comprising in combination:
   a) a source of water under pressure associated with said wash basin;
   b) means for discharging a flow of water from said source of water into the wash basin;
   c) a means for containing liquid soap to be dispensed;
   d) means for pressurizing said containing means in response to the flow of water;
   e) means for dispensing the liquid soap into the wash basin in response to said pressurizing means;
   f) means for reducing the pressure within said containing means in response to a cessation of the flow of water;
   g) means for replenishing said containing means with liquid soap in response to operation of said reducing means;
   h) said container having an inlet and and an outlet different from said inlet;
   i) the water and the soap being dispensed through separate nozzles; and
   j) means for detecting the proximity of the user to the wash basin.

18. The apparatus as set forth in claim 17 including a source of liquid soap for supplying said replenishing means with the liquid soap.

19. The apparatus as set forth in claim 17 including means for preventing intermixing of the soap and water.

20. The apparatus as set forth in claim 17 wherein said dispensing means includes means for increasing the volume of said containing means in response to cessation of flow of the water.

21. The apparatus as set forth in claim 17 including means for initially filling said containing means with the soap.

* * * * *